United States Patent [19]

Tanaka et al.

[11] Patent Number: 4,764,878
[45] Date of Patent: Aug. 16, 1988

[54] SURFACE CUTTING METHOD

[75] Inventors: Kunio Tanaka; Yasushi Onishi, both of Tokyo, Japan

[73] Assignee: Fanuc Ltd, Minamitsuru, Japan

[21] Appl. No.: 43,350

[22] PCT Filed: Jul. 21, 1986

[86] PCT No.: PCT/JP86/00380

§ 371 Date: Mar. 17, 1987

§ 102(e) Date: Mar. 17, 1987

[87] PCT Pub. No.: WO87/00474

PCT Pub. Date: Jan. 29, 1987

[30] Foreign Application Priority Data

Jul. 20, 1985 [JP] Japan ................. 60-160892

[51] Int. Cl.$^4$ ............................................. G05B 19/00
[52] U.S. Cl. ...................................... 364/474; 364/170; 318/572
[58] Field of Search .................. 364/167–171, 364/474, 475; 318/572

[56] References Cited

U.S. PATENT DOCUMENTS 4,621,959 11/1986 Kishi et al. ............... 364/475 X
4,706,200 11/1987 Kishi et al. ............... 364/474
4,706,201 11/1987 Kishi et al. ............... 364/474

Primary Examiner—Jerry Smith
Assistant Examiner—Allen MacDonald
Attorney, Agent, or Firm—Staas & Halsey

[57] ABSTRACT

The invention relates to a surface cutting method for back-and-forth surface cutting of the interior of an area (AR) bounded by a closed curve.

The surface cutting method includes repeating the following steps:

a step of obtaining points of intersection $P_i$, $Q_i$ between an i-th cutting path ($PT_i$) and an offset curve offset (OFC') by (T+C+R) to the outer side of the closed curve, as well as points of intersection $P_{i+1}$, $Q_{i+1}$ between the offset curve and an (i+1)th cutting path ($PT_{i+1}$), where T, C and R represent excess thickness, amount of clearance and tool radius, respectively;

a step of obtaining a coordinate value, in the cutting path direction, of an outermost point $R_i$ on the offset curve (OFC') between the points of intersection $Q_i$, $Q_{i+1}$, where $Q_i$ is a point of intersection on a cutting end point side of the i-th cutting path ($PT_i$) and $Q_{i+1}$ is a point of intersection on a cutting starting point side of the (i+1)th cutting path ($PT_{i+1}$);

a step of performing surface cutting by moving a tool along the i-th cutting path until a coordinate value of the position of the tool in the cutting path direction coincides with the coordinate value of the point $R_i$ in the cutting path direction; and a step of moving the tool at a cutting velocity to the next (i+1)th cutting path ($PT_{i+1}$) in a shift direction.

3 Claims, 5 Drawing Sheets

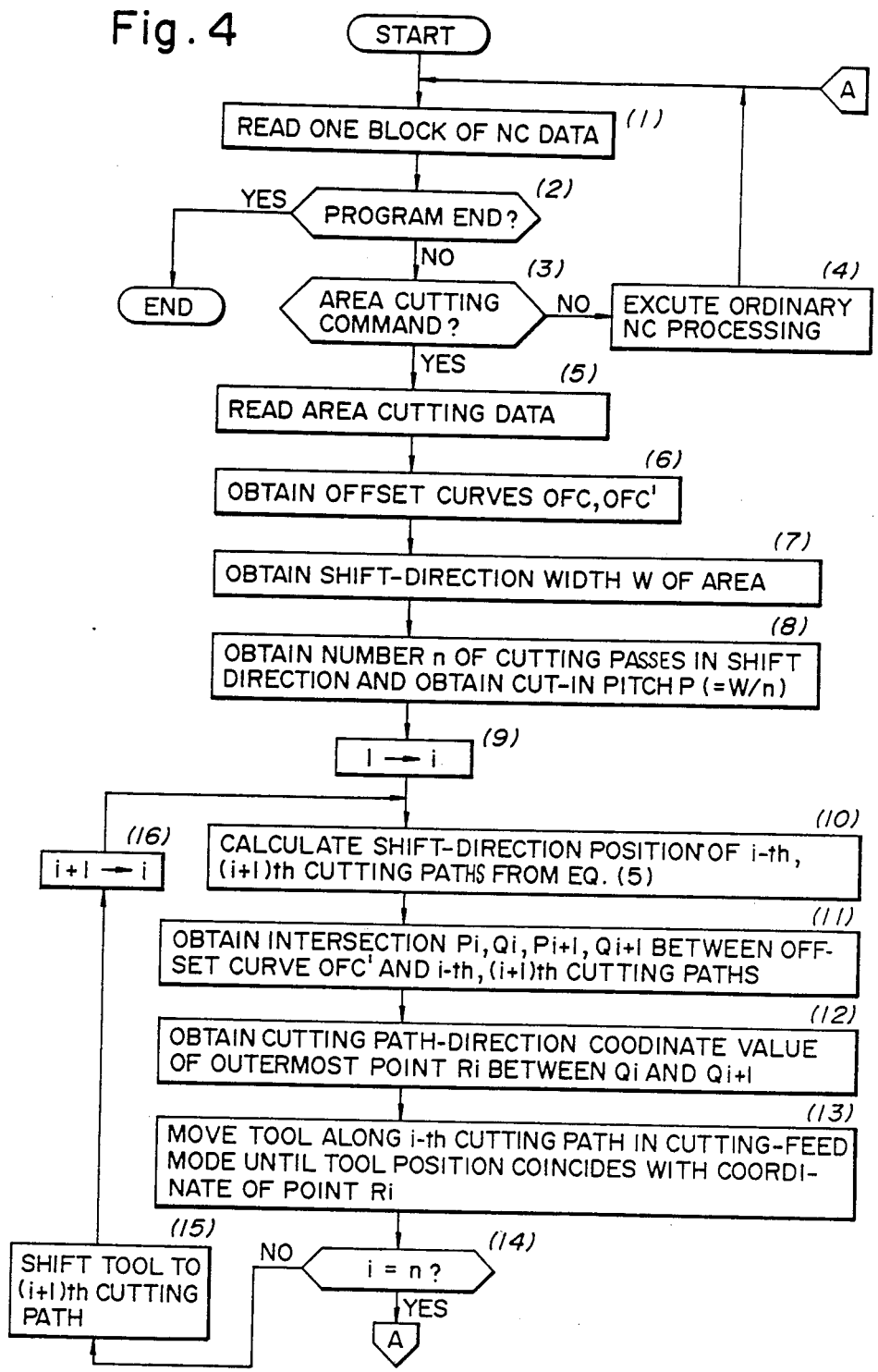

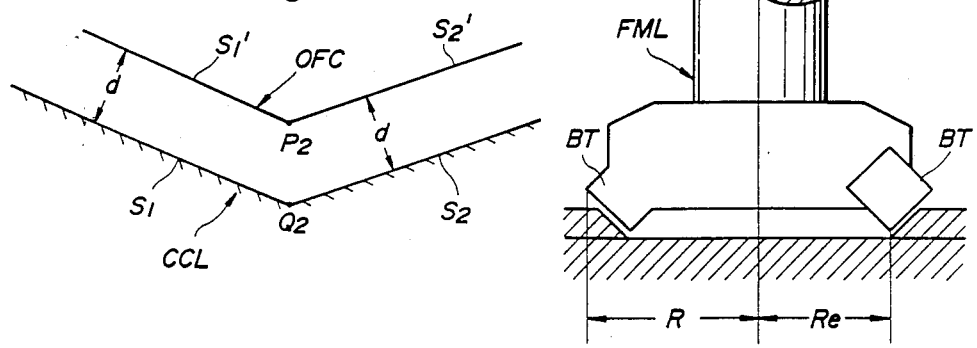
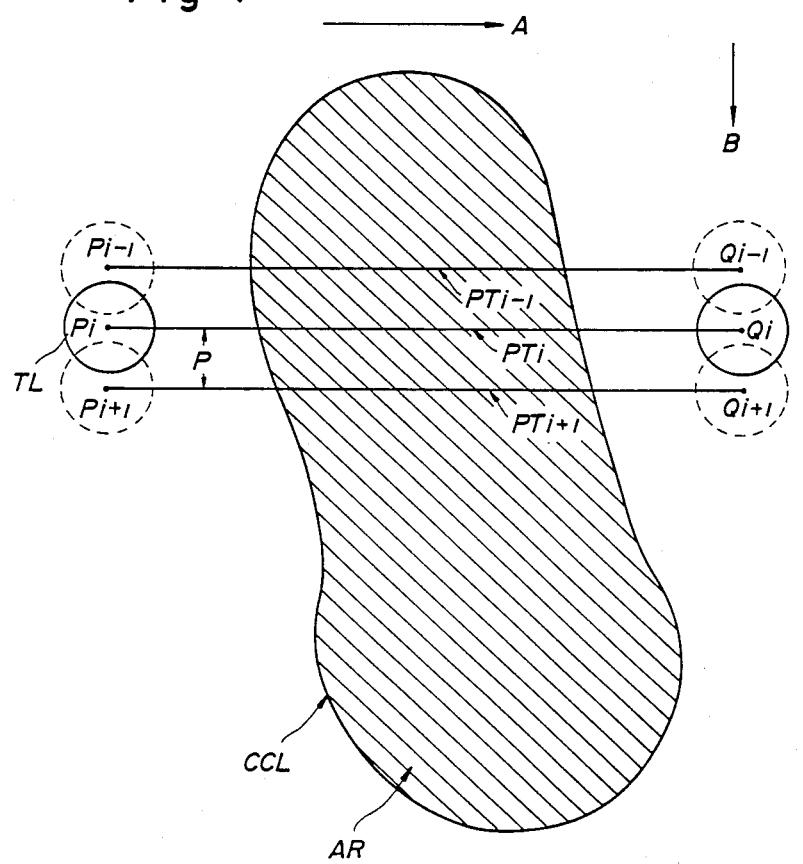

SURFACE CUTTING METHOD

TECHNICAL FIELD

This invention relates to a surface cutting method and, more particularly, to a surface cutting method for cutting a surface within an area bounded by a closed curve by moving a tool along a cutting path in a predetermined direction to cut the surface within the area, thenceforth moving the tool along an adjacent cutting path, obtained by a shift of a predetermined amount, in a direction opposite the predetermined direction to cut the surface, and repeating such two-way cutting.

BACKGROUND ART

A form of numerically controlled machining is one in which there is an area bounded by a closed curve, wherein surface cutting is applied to a portion (convex portion) projecting from an area on the outer side of the closed curve.

Such an area cutting (surface cutting) method includes the following steps:

(a) inputting data specifying a closed curve CCL of an area AR shown in FIG. 7, cutting direction (direction of arrow A) along cutting path $PT_i$ (i=1, 2, ...), shift direction (direction of arrow B) in which a tool TL is shifted by a predetermined amount of cut-in whenever surface cutting along the cutting path $PT_i$ ends, and cut-in amount P;

(b) generating the cutting path $PT_i$ on the basis of the inputted data;

(c) performing cutting by moving the tool along the cutting path $PT_i$ from a cutting starting point $P_i$ to a cutting end point $Q_i$ on the generated cutting path $PT_i$;

(d) obtaining the next cutting path $PT_{i+1}$, which results when the tool is shifted by the amount of cut-in P following the end of cutting along the preceding cutting path;

(e) thereafter performing cutting (unidirectional cutting) by moving the tool from point $P_{i+1}$ to point $Q_{i+1}$, in which point $P_{i+1}$ is taken as the cutting starting point of cutting path $PT_{i+1}$ and point $Q_{i+1}$ is taken as the cutting end point of cutting path $PT_{i+1}$, or performing cutting (back-and-forth cutting) by moving the tool from point $Q_{i+1}$ to point $P_{i+1}$, in which point $Q_{i+1}$ is taken as the cutting starting point of cutting path $PT_{i+1}$ and point $P_{i+1}$ is taken as the cutting end point of cutting path $PT_{i+1}$; and (f) repeating the unidirectional or back-and-forth cutting operation from this point onward to surface-cut the area AR. When cutting must be carried out by an up-cut or down-cut method, which depends upon the workpiece, surface cutting is performed unidirectionally. If the up-cut/down-cut method need be taken into consideration, surface cutting is performed by back-and-forth cutting.

In the conventional surface cutting method, the cutting starting point and end point of each cutting path PTi (i=1, 2, ...) are set fairly remote from the area boundary line so as not to leave any portions uncut. This results in a long tool pass along each cutting path, namely in a lengthy period of time during which surface cutting is not carried out. Consequently, machining efficiency is poor.

Accordingly, an object of the present invention is to provide a surface cutting method through which tool pass can be shortened without leaving portions uncut.

Another object of the present invention is to provide a surface cutting method through which a portion projecting from an area can be cut away in a reliable manner.

DISCLOSURE OF THE INVENTION

The present invention provides a surface cutting method for back-and-forth surface cutting of the interior of an area bounded by a closed curve.

The surface cutting method includes repeating the following steps:

a step of obtaining points of intersection $P_i$, $Q_i$ between an i-th cutting path and an offset curve offset by (T+C+R) to the outer side of the closed curve, as well as points of intersection $P_{i+1}$, $Q_{i+1}$ between the offset curve and an (i+1)th cutting path, where T, C and R represent excess thickness, amount of clearance and tool radius, respectively;

a step of obtaining a coordinate value, in the cutting path direction, of an outermost point $R_i$ on the offset curve between the points of intersection $Q_i$, $Q_{i+1}$, where $Q_i$ is a point of intersection on a cutting end point side of the i-th cutting path and $Q_{i+1}$ is a point of intersection on a cutting starting point side of the (i+1)th cutting path;

a step of performing surface cutting by moving a tool along the i-th cutting path until a coordinate value of the position of the tool in the cutting path direction coincides with the coordinate value of the point $R_i$ in the cutting path direction; and a step of moving the tool at a cutting velocity to the next (i+1)th cutting path in a shift direction.

BRIEF DESCRIPTION OF THE DRAWINGS

FIG. 4 is a flowchart of processing indicative of the surface cutting method of the present invention;

FIG. 5 is a view for describing offset processing;

FIG. 6 is a view for describing the effective radius and radius of a tool; and

FIG. 7 is a view for describing the prior-art method.

BEST MODE FOR CARRYING OUT THE INVENTION

Figure 1A:
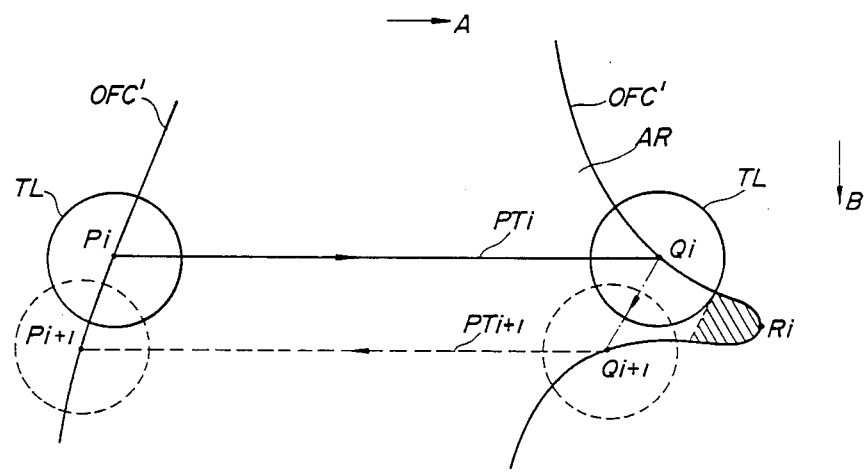
FIGS. 1(A) and (B) and 2(A) and (B) are views for describing the general features of the present invention.
Figure 1B:
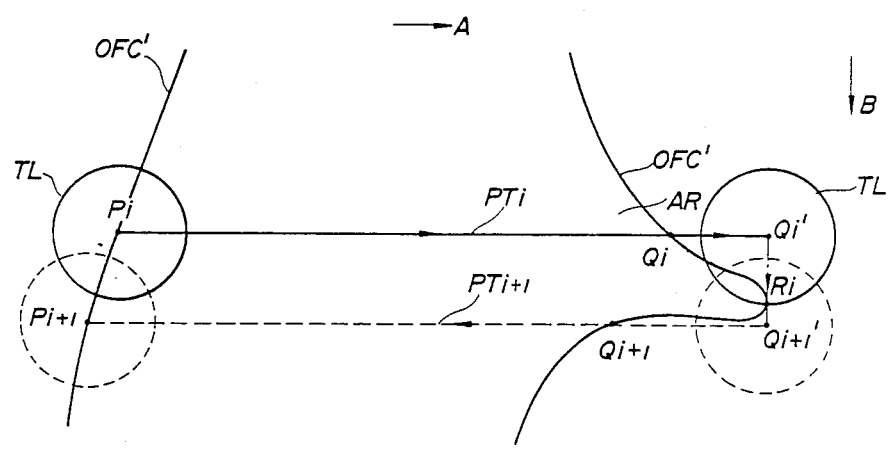
Figure 2A:
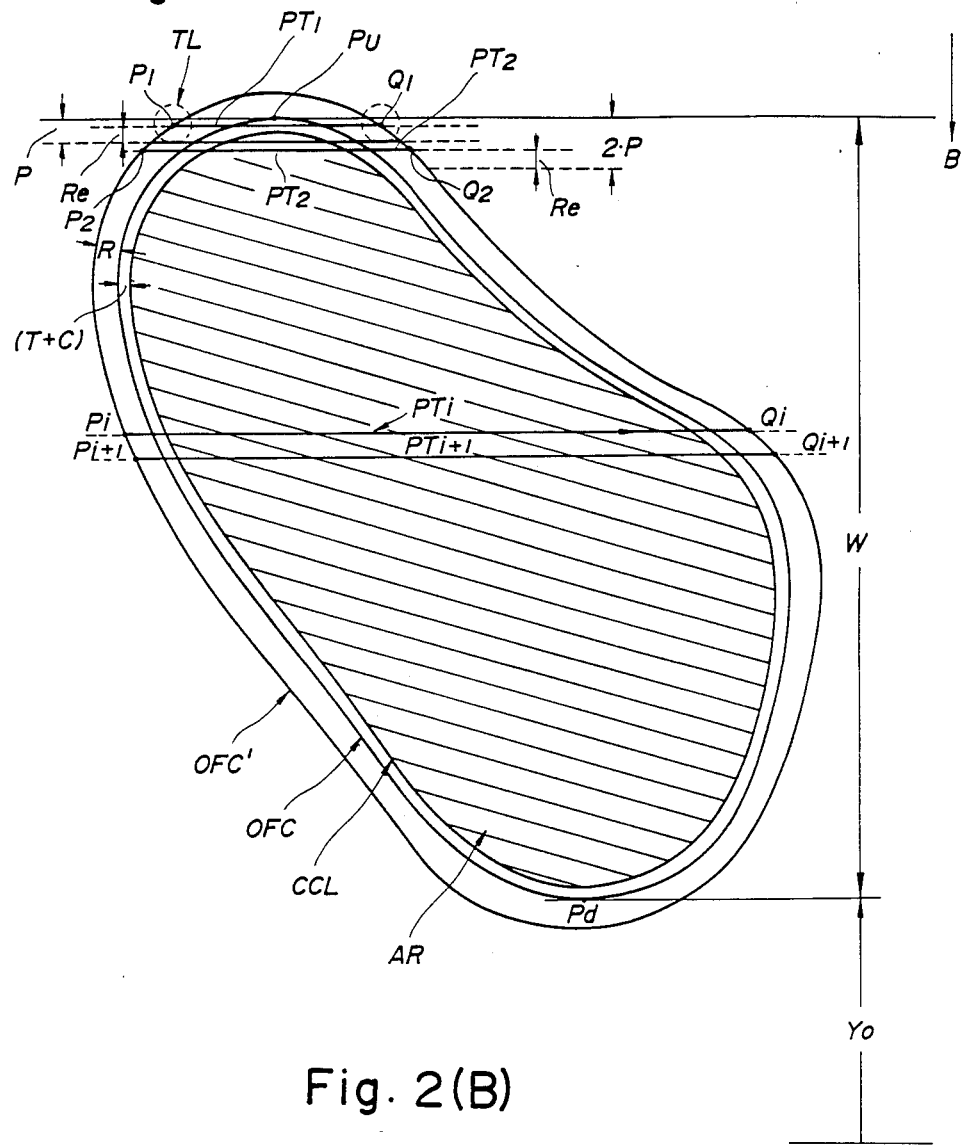
Figure 2B:
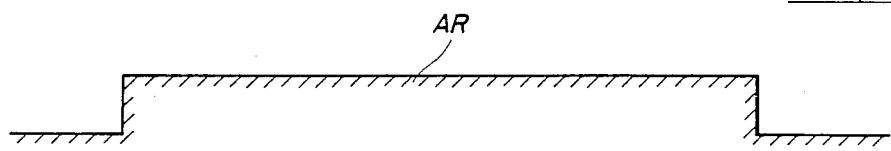

FIGS. 1 and 2 are views for describing the general features of the present invention. In FIG. 1, OFC' denotes an offset curve offset a predetermined amount to the outer side of a closed curve, not shown. AR represents an area to undergo surface machining, and TL denotes a tool. Arrow A indicates the direction of a cutting path, and arrow B the direction of a shift. Further, $PT_i$ (i=1, 2 ...) denotes a cutting path, $P_i$, $Q_i$ designate points of intersection, on machining starting point and end point sides, respectively, between the cutting path $PT_i$ and offset curve OFC', $P_{i+1}$, $Q_{i+1}$ designate points of intersection, on machining end point and starting point sides, respectively, between the cutting path $PT_{i+1}$ and offset curve OFC', and $R_i$ represents the outermost point of the offset curve between the points of intersection $Q_i$ and $Q_{i+1}$.

In FIG. 2, CCL represents a closed curve, and AR (the shaded portion) denotes the area to undergo surface machining bounded by the closed curve CCL. OFC designates an offset curve offset to the outer side of the closed curve CCL by the sum of excess thickness T and amount of clearance C. OFC' is an offset curve offset to the outer side of the closed curve by $(T+C+R)$, where R is the tool radius. Re designates the effective tool radius. The arrow A indicates the direction of the cutting path, arrow B indicates the direction of a shift, W denotes the width of the area A in the shift direction, $PT_i$ denotes a tool path, and P represents the amount of cut-in.

As shown in FIG. 2, tool pass in the cutting path direction (direction of arrow A) can be minimized in length if the cutting starting point and end point of each cutting path $PT_i$ ($i=1, 2, \ldots$) are situated on the offset curve OFC' offset, to the outer side of the closed path CCL specifying the area AR to be surface-cut, by the sum $(T+C+R)$ of the excess thickness T, clearance amount C and tool radius R. Depending on the shape of the offset curve, however, there are cases where this method leaves a portion uncut.

By way of example, as shown in FIG. 1(A), there is a case where the shape of the offset curve protrudes beyond the tool radius between the points of intersection $Q_i$, $Q_{i+1}$, where $Q_i$ is the point of intersection on the cutting end point side of cutting path $PT_i$ and $Q_{i+1}$ is the point of intersection on the cutting starting point side of cutting path $PT_{i+1}$. In such case the shaded portion is left uncut.

Accordingly, in the present invention, and with reference to FIG. 1(B), the points of intersection $P_i$, $Q_i$ between the i-th cutting path $PT_i$ and the offset curve OFC' offset by $(T+C+R)$ to the outer side of the closed curve specifying the area, as well as the points of intersection $P_{i+1}$, $Q_{i+1}$ between the offset curve OFC' and $(i+1)$th cutting path $PT_{i+1}$, are obtained, where T, C and R represent excess thickness, amount of clearance and tool radius, respectively.

Next, the coordinate, in the cutting path direction, of the outermost point $R_i$ on the offset curve OFC' between the points of intersection $Q_i$, $Q_{i+1}$ is obtained, where $Q_i$ is the point of intersection on the cutting end point side of the cutting path $PT_i$ and $Q_{i+1}$ is the point of intersection on the cutting starting point side of the cutting path $PT_{i+1}$.

Surface cutting is then performed by moving the tool TL along the i-th cutting path $PT_i$ until coordinate of the position of the tool in the cutting path direction coincides with the coordinate of the point $R_i$.

Thereafter, the tool is moved to the point $Q_{i+1}$ on the next cutting path $PT_{i+1}$ in the shift direction. The foregoing steps are thenceforth repeated to cut the surface.

Thus, according to the invention, uncut portions can be reliably eliminated and tool pass shortened to improve cutting efficiency.

Figure 3:
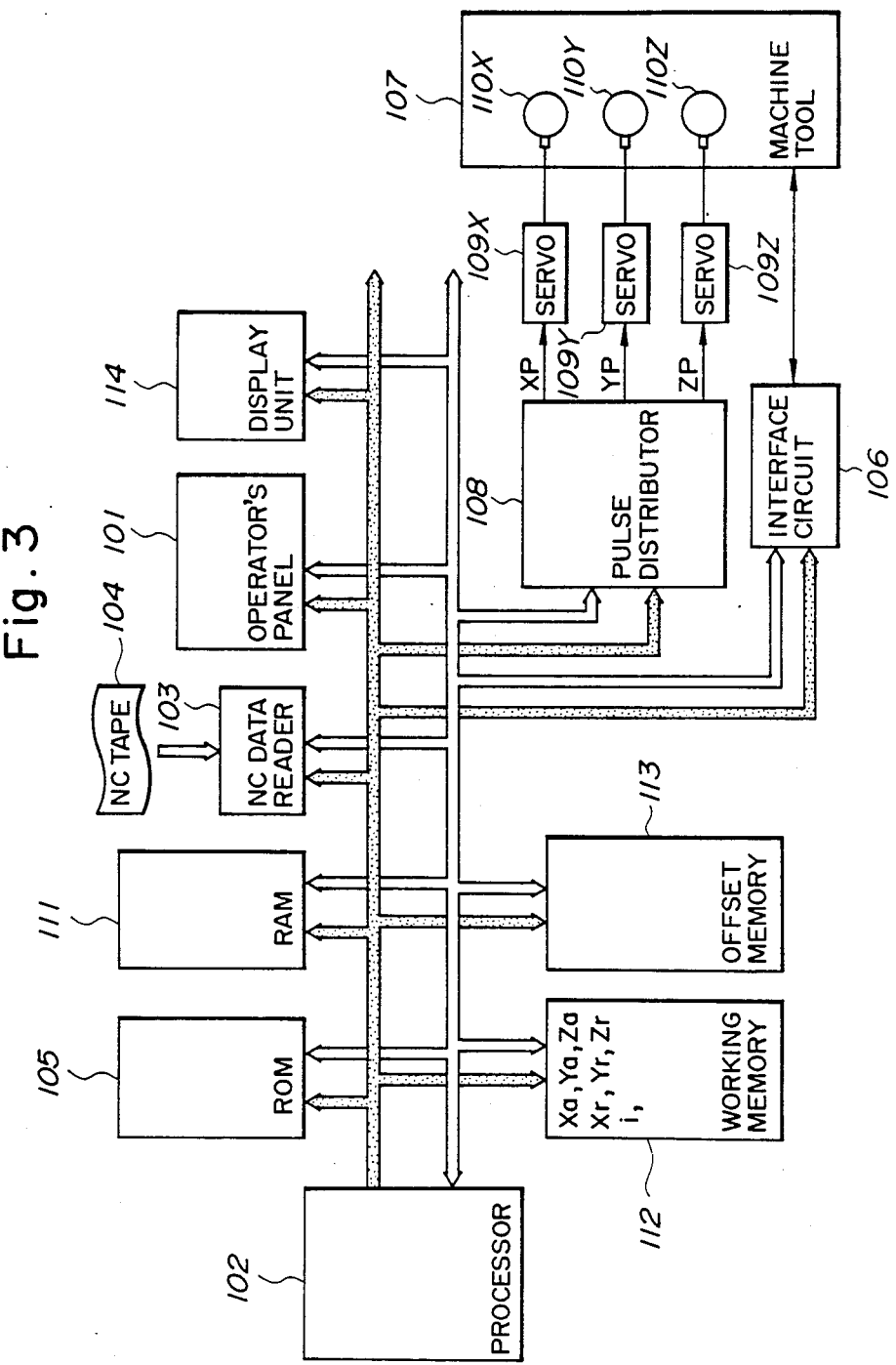
FIG. 3 is a block diagram of an apparatus for realizing the present invention.

FIG. 3 is a block diagram of an embodiment of the invention, and FIG. 4 is a flowchart of processing according to the invention. The area cutting method of the invention will now be described with reference to FIGS. 1 through 4.

(1) When a cycle start button on an operator's panel 101 is pressed, a processor 102 causes an NC data reader 103 to read one block of NC data from an NC tape 104. The NC tape 104 stores area cutting (surface cutting) data in addition to ordinary path data, G-function instruction data and M-, S- and T-function instruction data. Stored at the end of the NC program is an M code (M02) indicating program end. Placed at the beginning of the area cutting data is an area cutting command indicating that the data which follow it are the area cutting data. Placed at the end of the area cutting data is a code indicative of the end of the area cutting data.

(2) The processor 102, placed under the control of a control program stored in a ROM 105, checks whether an item of the read NC data is "M02", which is indicative of program end. If the item of data is "M02", numerical control processing is ended.

(3) If the item of read NC data is not "M02" indicative of program end, then the processor 102 checks whether the item of NC data is the area cutting command.

(4) If the item of NC data is not the area cutting command, the processor 102 executes ordinary numerical control processing.

By way of example, if an item of NC data is an M-, S- or T-function instruction, the processor delivers the data to a machine tool 107 via an interface circuit 106. When the machine tool 107 generates a completion signal indicating completion of processing for the M-, S- or T-function instruction, the processor causes the NC data reader 103 to read the next item of NC data.

If the item of NC data is path data, then the processor obtains incremental values $X_i$, $Y_i$, $Z_i$ along the respective axes, obtains traveling distances , $\Delta X$, $\Delta Y$, $\Delta Z$, which are to be traversed along the respective axes per unit time $\Delta T$, from the aformentioned incremental values and commanded feed velocity F, and delivers these to a pulse distributor 108.

On the basis of the input data ($\Delta X$, $\Delta Y$, $\Delta Z$), the pulse distributor 108 performs a simultaneous three-axis pulse distribution calculation to generate distributed pulses $X_P$, $Y_P$, $Z_P$. The distributed pulses are applied as inputs to servo circuits 109X, 109Y, 109Z for the respective axes, thereby rotating servomotors 110X, 110Y, 110Z so that the tool is moved along the cutting path.

The processor 102, in accordance with the following formulae, updates the present position $X_a$, $Y_a$ $Z_a$ along the respective axes every $\Delta T$ sec, $X_a$, $Y_a$, $Z_a$ having been stored in a working memory 112:

$$X_a \pm \Delta X \rightarrow X_a \tag{1a}$$

$$Y_a \pm \Delta Y \rightarrow Y_a \tag{1b}$$

$$Z_a \pm \Delta Z \rightarrow Z_a \tag{1c}$$

The sign depends upon the direction of movement. Similarly, in accordance with the following formulae, the processor 102 updates remaining traveling distances $X_r$, $Y_r$, $Z_r$ (the initial values of which are the incremental values $X_i$, $Y_i$, $Z_i$, respectively) every $\Delta T$ sec, $X_r$, $Y_r$, $Z_r$ having been stored in the working memory 112:

$$X_r - \Delta X \rightarrow X_r \tag{2a}$$

$$Y_r - \Delta Y \rightarrow Y_r \tag{2b}$$

$$Z_r - \Delta Z \rightarrow Z_r \tag{2c}$$

When the following condition is established:

$$X_r = Y_r = Z_r = 0 \tag{5}$$

this means that the tool has arrived at the target position. The processor 102 then causes the NC data reader 103 to read the next item of NC data.

(5) If the item of NC data is found to be the area cutting command at the decision step (3), the processor 102 causes the NC data reader 103 to read the area cutting data and store the data in a RAM 111 until the code indicating the end of the area cutting data is read out. It should be noted that the area cutting data are as follows:

(i) data indicating surface cutting or pocket cutting (assumed here to be the former);

(ii) data specifying the curve (closed curve) CCL of the external shape of the area AR (see FIG. 2);

(iii) cutting path direction data (the direction of arrow A in FIGS. 1 and 2, taken to be the +X direction);

(iv) shift direction data (the direction of arrow B in FIGS. 1 and 2, taken to be the −Y direction);

(v) maximum amount of cut-in D (vi) cutting velocity;

(vii) excess thickness T; and (viii) amount of clearance C.

(6) When the reading of the area cutting data ends, the processor 102 calculates the offset curve OFC offset from the closed curve CCL (FIG. 2) by a distance d (=T+C) obtained by adding the excess thickness T and amount of clearance C. It should be noted that the offset curve OFC is found through the following processing. Specifically, as shown in FIG. 5, let two straight lines specifying the closed curve CCL be S1 and S2. Straight lines S1′, S2′ offset from the straight lines S1, S2, respectively, by the distance d are found. The intersection P2 of the straight lines S1′, S2′ is then found. The intersection P2 is one point specifying the offset curve OFC. Accordingly, if points of intersection are found in a similar manner and stored in the RAM 111, the offset curve OFC will be obtained. Obtained together with the offset curve OFC is the offset curve OFC′ offset to the outer side of the closed curve CCL by (T+C+R). Note that R is the tool radius and is stored in correspondence with a tool number in an offset memory 113.

(7) Next, the processor 102 obtains the width W (see FIG. 2), in the shift direction (direction of arrow B), of the area bounded by the offset curve OFC.

If the coordinate values $Y_{max}$, $Y_{min}$ of points $P_u$, $P_d$ at the uppermost and lowermost ends, respectively, of the offset curve OFC in the shift direction are obtained, the shift-direction width W of the area to be surface-cut can be found from the following formula:

$$Y_{max} - Y_{min} \rightarrow W \quad (4)$$

(8) When the width W has been found, the processor 102 determines the length of line segments, obtained by dividing the width W into n (an integer) equal parts, nearest a preset maximum cut-in amount D without exceeding the same. This length is made the actual cut-in amount P (=W/n).

(9) When the cut-in amount P has been found, the processor performs the operation 1→i.

(10) Adopting $R_e$ as the effective tool radius, the procesor 102 obtains the positions of the i-th cutting path $PT_i$ and (i+1)th cutting path $PT_{i+1}$ in the shift direction. The position Y of the i-th cutting path $PT_i$ is obtained in accordance with the equation $$Y = Y_0 + W - i \cdot P + R_e \quad (5)$$

Similarly, the position of the cutting path $PT_{i+1}$ is found by performing the operation i→i+1 in the above equation. Note that $Y_0$ is the coordinate (=$Y_{min}$) of the point $P_d$ at the lowermost end of the offset curve OFC. The effective tool radius $R_e$ is stored together with the tool radius R in correspondence with a tool number in the offset memory 113. Accordingly, the effective tool radius $R_e$ corresponding to a commanded tool number can be obtained by reading it from the memory.

The effective tool radius $R_e$ is the radius of the tool that actually participates in surface cutting. FIG. 6 illustrates the relationship between tool radius R and effective tool radius $R_e$ in the case of a face milling machine FML. In FIG. 6, BT represents the blade edge.

(11) When the shift-direction positions of the i-th cutting path $PT_i$ and (i+1)th cutting path $PT_{i+1}$ have been found, the points of intersection $P_i$, $Q_i$ between the cutting path $P_i$ and offset curve OFC′, and the points of intersection $P_{i+1}$, $Q_{i+1}$ between the cutting path $PT_{i+1}$ and offset curve OFC′ are calculated.

(12) Let $Q_i$ be the point of intersection on the cutting end point side of cutting path $PT_i$, and let $Q_{i+1}$ be the point of intersection on the cutting starting point side of cutting path $PT_{i+1}$. The processor obtains the coordinate value, in the cutting path direction (X direction), of the outermost point $R_i$ [see FIG. 1(B)] on the offset curve OFC′ between the points of intersection $Q_i$, $Q_{i+1}$.

(13) When the coordinate of point $R_i$ has been found, path processing similar to that of step (4) is executed to move the tool TL from the cutting starting point (e.g. $P_i$) of the i-th cutting path $PT_{i+1}$ at the cutting velocity. When the coordinate of the tool TL in the tool path direction coincides with the coordinate of the point $R_i$ in the tool path direction, cutting along the i-th cutting path $PT_i$ ends.

(14) When cutting along the i-th cutting path $PT_i$ ends, the processor 102 checks whether i=n holds.

If i=n holds, surface cutting of area AR ends and processing is executed from step (1) onward.

(15) If i<n holds, on the other hand, then the processor 102 moves the tool in the shift direction (−Y direction) to the next cutting path $PT_{i+}$ in the cutting-feed mode.

(16) Thereafter, the processor increments i in accordance with the expression $$i + 1 \rightarrow i$$

and repeats processing from step (10) onward.

In the case described above, an area cutting command is inserted into an NC tape in advance, cutting paths are generated successively by using the area cutting data that follow the area cutting command, and surface cutting is performed by moving a tool along the cutting paths. However, the present invention is not limited to such an arrangement. An arrangement can be adopted in which after the area data are inputted from a keyboard, an NC tape (NC data) is created through a method substantially the same as that described above and the NC tape is inputted to an NC unit to perform area cutting. However, instead of moving the tool in the 13th and 15th steps, NC data for tool movement would be prepared.

In accordance with the present invention described above, tool pass can be shortened. In addition, if an area has a projecting portion, the portion can be cut away reliably without leaving portions uncut.

We claim:

1. A surface cutting method for cutting a surface within an area bounded by a predetermined closed curve by moving a tool along a cutting path $PT_i$ in a predetermined direction to cut the surface within the area, thenceforth moving the tool along an adjacent cutting path $PT_{i+1}$, obtained by a shift of a predetermined amount, in a direction opposite said predetermined direction to cut the surface, and repeating this back-and-forth cutting, said method characterized by including:

a first step of obtaining points of intersection $P_i$, $Q_i$ between said cutting path $PT_i$ and an offset curve offset by $(T+C+R)$ to the outer side of said closed curve, as well as points of intersection $P_{i+1}$, $Q_{i+1}$ between said offset curve and cutting path $PT_{i+1}$, where T, C and R represent excess thickness, amount of clearance and tool radius, respectively;

a second step of obtaining a coordinate value, in the cutting path direction, of an outermost point $R_i$ on the offset curve between the points of intersection $Q_i$, $Q_{i+1}$, where $Q_i$ is a point of intersection on a cutting end point side of the cutting path $PT_i$ and $Q_{i+1}$ is a point of intersection on a cutting starting point side of the cutting path $PT_{i+1}$;

a third step of performing surface cutting by moving the tool along the cutting path $PT_i$ until a coordinate value of the position of the tool in the cutting path direction coincides with the coordinate value of said point $R_i$ in the cutting path direction; and a fourth step of moving the tool at a cutting velocity to the next cutting path $PT_{i+1}$ in a shift direction.

2. A surface cutting method according to claim 1, wherein surface cutting is applied to the entirety of the area by repeating said first through fourth steps.

3. A surface cutting method according to claim 1, characterized in that said first step includes:

a step of obtaining a position Y of the i-th cutting path in the shift direction in accordance with the following equation:

$$Y = Y_0 + W - i \cdot P + R_e$$

where W represents the width, in said shift direction, of an area bounded by an offset curve offset by $(T+C)$ to the outer side of said closed curve, $Y_0$ represents a position at the lowermost end of said area in the shift direction, P represents cut-in pitch, and $R_e$ represents effective tool radius, and said points of intersection $P_i$, $Q_i$ are obtained by using data indicative of the position of said cutting path and data indicative of the offset curve offset by $(T+C+R)$ to the outer side of the closed curve.

* * * * *